US012394926B2

(12) United States Patent
Meng et al.

(10) Patent No.: US 12,394,926 B2
(45) Date of Patent: Aug. 19, 2025

(54) ELECTRICAL PLUG CONNECTOR, ELECTRICAL RECEPTACLE CONNECTOR, AND ELECTRICAL CONNECTOR ASSEMBLY HAVING THE SAME

(71) Applicant: ADVANCED-CONNECTEK INC., New Taipei (TW)

(72) Inventors: Ta-Teh Meng, New Taipei (TW); Mei Shi, New Taipei (TW); Ya-Ping Liang, New Taipei (TW); Meng Liu, New Taipei (TW); Ping Shi, New Taipei (TW); Jia-Ying Wu, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 360 days.

(21) Appl. No.: 17/992,288

(22) Filed: Nov. 22, 2022

(65) Prior Publication Data

US 2023/0163501 A1 May 25, 2023

(30) Foreign Application Priority Data

Nov. 24, 2021 (CN) ......................... 202122895240.0

(51) Int. Cl.
*H01R 12/72* (2011.01)
*H01R 12/73* (2011.01)
*H01R 12/91* (2011.01)

(52) U.S. Cl.
CPC ......... *H01R 12/727* (2013.01); *H01R 12/732* (2013.01); *H01R 12/91* (2013.01)

(58) Field of Classification Search
CPC .... H01R 12/727; H01R 12/732; H01R 12/91; H01R 12/73
See application file for complete search history.

(56) References Cited

U.S. PATENT DOCUMENTS

| | | | | |
|---|---|---|---|---|
| 9,484,656 B2 * | 11/2016 | Doi | ...................... | H01R 12/716 |
| 9,698,508 B2 * | 7/2017 | Kobayashi | ............. | H01R 12/91 |
| 10,707,619 B2 * | 7/2020 | Suzuki | ................. | H01R 13/502 |
| 2008/0296133 A1 * | 12/2008 | Ura | ........................ | H01R 12/91 200/1 A |
| 2015/0064975 A1 * | 3/2015 | Funayama | ............. | H01R 13/20 439/626 |

* cited by examiner

*Primary Examiner* — Travis S Chambers
(74) *Attorney, Agent, or Firm* — Muncy, Geissler, Olds & Lowe, P.C.

(57) ABSTRACT

An electrical connector assembly includes an electrical plug connector and an electrical receptacle connector corresponding to the electrical plug connector. The electrical plug connector includes a plug fixation housing, a plug movable housing, and plug terminals. The plug terminals are on the plug fixation housing, and the plug movable housing is floatingly arranged on the plug fixation housing. The electrical receptacle connector includes a receptacle fixation housing, a receptacle movable housing, and receptacle terminals. The receptacle terminals are on the receptacle fixation housing, and the receptacle movable housing is floatingly arranged on the receptacle fixation housing. An electrical plug connector and an electrical receptacle connector are also provided.

15 Claims, 7 Drawing Sheets

ELECTRICAL PLUG CONNECTOR, ELECTRICAL RECEPTACLE CONNECTOR, AND ELECTRICAL CONNECTOR ASSEMBLY HAVING THE SAME

CROSS-REFERENCE TO RELATED APPLICATION

This non-provisional application claims priority under 35 U.S.C. § 119(a) to Patent Application No. 202122895240.0 filed in China, P.R.C. on Nov. 24, 2021, the entire contents of which are hereby incorporated by reference.

FIELD OF THE INVENTION

The instant disclosure relates to an electrical connector assembly, and more particular to an electrical plug connector, an electrical receptacle connector, and a board-to-board electrical connector assembly comprising an electrical plug connector and an electrical receptacle connector.

BACKGROUND

The board-to-board (BTB) electrical connector is an electrical connector assembly. The electrical connector assembly comprises a plug connector and a receptacle connector corresponding to the plug connector. The plug connector is arranged with a plurality of male terminals. The receptacle connector is arranged with a plurality of female terminals. When plug first connector is inserted into the receptacle connector, the male terminals are mated with the female terminals to achieve the signal transmission between two printed circuit boards.

SUMMARY OF THE INVENTION

For a BTB electrical connector known to the inventor, the plug connector includes a plug fixation housing and fixation terminals, and the receptacle connector includes a receptacle fixation housing, a receptacle movable housing, and Z-shaped terminals, wherein the receptacle fixation housing and the receptacle movable housing are connected with each other through the Z-shaped terminals. After the plug connector is mated with the receptacle connector, the plug connector is in a fixed state and cannot be moved freely, and the receptacle connector is in a movable state. As a result, upon mating the plug connector with the receptacle connector, if the plug connector is not properly aligned with the receptacle connector, the plug connector cannot be adjusted to the correct mating orientation.

In view of this, an embodiment of the instant disclosure provides an electrical connector assembly. The electrical connector assembly comprises an electrical plug connector and an electrical receptacle connector. The electrical plug connector comprises a plug fixation housing, a plug movable housing, and a plurality of plug terminals. The plug fixation housing has a receiving space and a plurality of first terminal positioning grooves at two sides of the receiving space. The plug movable housing is in the receiving space. The plug movable housing has a plug mating portion and a plurality of second terminal positioning grooves at two sides of the plug mating portion, and the plug mating portion is exposed from the receiving space. Each of the plug terminals comprises a first fixation portion, a second fixation portion, and a plug contact portion. Each of the first fixation portions is positioned at a corresponding one of the first terminal positioning grooves, and each of the second fixation portions is positioned at a corresponding one of the second terminal positioning grooves. In each of the plug terminals, the plug contact portion is adjacent to the second fixation portion. The electrical receptacle connector comprises a receptacle fixation housing, a receptacle movable housing, and a plurality of receptacle terminals. The receptacle fixation housing has a working space and a plurality of third terminal positioning grooves at two sides of the working space. The receptacle movable housing is in the working space. The receptacle movable housing has a receptacle mating portion and a plurality of fourth terminal positioning grooves at two sides of the receptacle mating portion, and the receptacle mating portion is exposed from the working space. Each of the third fixation portions is positioned at a corresponding one of the third terminal positioning grooves, and each of the fourth fixation portions is positioned at a corresponding one of the fourth terminal positioning grooves. In each of the receptacle terminals, the receptacle contact portion is adjacent to the fourth fixation portion.

In some embodiments, each of the plug terminals has a plug continuous bending portion between the first fixation portion and the second fixation portion, and the first fixation portion and the second fixation portion are at different horizontal axes.

In some embodiments, in each of the plug terminals, the plug continuous bending portion is S-shaped and has a first turning portion and a second turning portion, the first turning portion is adjacent to the first fixation portion, and the second turning portion is adjacent to the second fixation portion.

In some embodiments, each of the receptacle terminals has a receptacle continuous bending portion between the third fixation portion and the fourth fixation portion, and the third fixation portion and the fourth fixation portion are at different horizontal axes.

In some embodiments, in each of the receptacle terminals, the receptacle continuous bending portion is S-shaped and has a third turning portion and a fourth turning portion, the third turning portion is adjacent to the third fixation portion, and the fourth turning portion is adjacent to the fourth fixation portion.

In some embodiments, the plug mating portion of the plug movable housing has an insertion groove, the receptacle mating portion of the receptacle movable housing has a protrusion, and the protrusion is mated with the insertion groove.

In some embodiments, the plug contact portions of the plug terminals are at two sides of the insertion groove, and the receptacle contact portions of the receptacle terminals protrude from two sides of the protrusion.

In some embodiments, the electrical connector assembly further comprises a plurality of plug hold-down members, and the plug hold-down members are fixed on the plug fixation housing and limited at two sides of the plug movable housing.

In some embodiments, the electrical connector assembly further comprises a plurality of receptacle hold-down members, and the receptacle hold-down members are fixed on the receptacle fixation housing and limited at two sides of the receptacle movable housing.

In another embodiment, an electrical plug connector is provided. The electrical plug connector comprises a plug fixation housing, a plug movable housing, and a plurality of plug terminals. The plug fixation housing has a receiving space and a plurality of first terminal positioning grooves at two sides of the receiving space. The plug movable housing is in the receiving space, and the plug movable housing has a plug mating portion and a plurality of second terminal positioning grooves at two sides of the plug mating portion, and the plug mating portion is exposed from the receiving space. Each of the plug terminals comprises a first fixation portion, a second fixation portion, and a plug contact portion. Each of the plug terminals is positioned at a corresponding one of the first terminal positioning grooves, and each of the second fixation portions is positioned at a corresponding one of the second terminal positioning grooves. In each of the plug terminals, the plug contact portion is adjacent to the second fixation portion.

In some embodiments, each of the plug terminals has a plug continuous bending portion between the first fixation portion and the second fixation portion, and the first fixation portion and the second fixation portion are at different horizontal axes.

In some embodiments, in each of the plug terminals, the plug continuous bending portion is S-shaped and has a first turning portion and a second turning portion, the first turning portion is adjacent to the first fixation portion, and the second turning portion is adjacent to the second fixation portion.

In some embodiments, the plug mating portion of the plug movable housing has an insertion groove, and the plug contact portions of the plug terminals are at two sides of the insertion groove.

In some embodiments, the electrical plug connector further comprises a plurality of plug hold-down members. The plug hold-down members are fixed on the plug fixation housing and limited at two sides of the plug movable housing.

In yet another embodiment, an electrical receptacle connector is provided. The electrical receptacle connector comprises a receptacle fixation housing, a receptacle movable housing, and a plurality of receptacle terminals. The receptacle fixation housing has a working space and a plurality of third positioning grooves at two sides of the working space. The receptacle movable housing is in the working space, and the receptacle movable housing has a receptacle mating portion and a plurality of fourth terminal positioning grooves at two sides of the receptacle mating portion, and the receptacle mating portion is exposed from the working space. Each of the receptacle terminals comprises a third fixation portion, a fourth fixation portion, and a receptacle contact portion. Each of the third fixation portions is positioned at a corresponding one of the third terminal positioning portions, and each of the fourth fixation portions is positioned at a corresponding one of the fourth terminal positioning grooves. In each of the receptacle terminals, the receptacle contact portion is adjacent to the fourth fixation portion.

In some embodiments, each of the receptacle terminals has a receptacle continuous bending portion between the third fixation portion and the fourth fixation portion, and the third fixation portion and the fourth fixation portion are at different horizontal axes.

In some embodiments, in each of the receptacle terminals, the receptacle continuous bending portion is S-shaped and has a third turning portion and a fourth turning portion, the third turning portion is adjacent to the third fixation portion, and the fourth turning portion is adjacent to the fourth fixation portion.

In some embodiments, the receptacle mating portion of the receptacle movable housing has a protrusion, and the receptacle contact portions of the receptacle terminals protrude from two sides of the protrusion.

In some embodiments, the electrical receptacle connector further comprises a plurality of receptacle hold-down members. The receptacle hold-down members are fixed on the receptacle fixation housing and limited at two sides of the receptacle movable housing.

Based on the above, according to one or some embodiments of the instant disclosure, the plug movable housing of the electrical plug connector and the receptacle movable housing of the electrical receptacle connector are mated with each other in a floating manner, thus allowing the electrical plug connector and the electrical receptacle connector to be mated with each other stably, and increasing the layout flexibility of the circuit boards soldered with the connector assembly.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
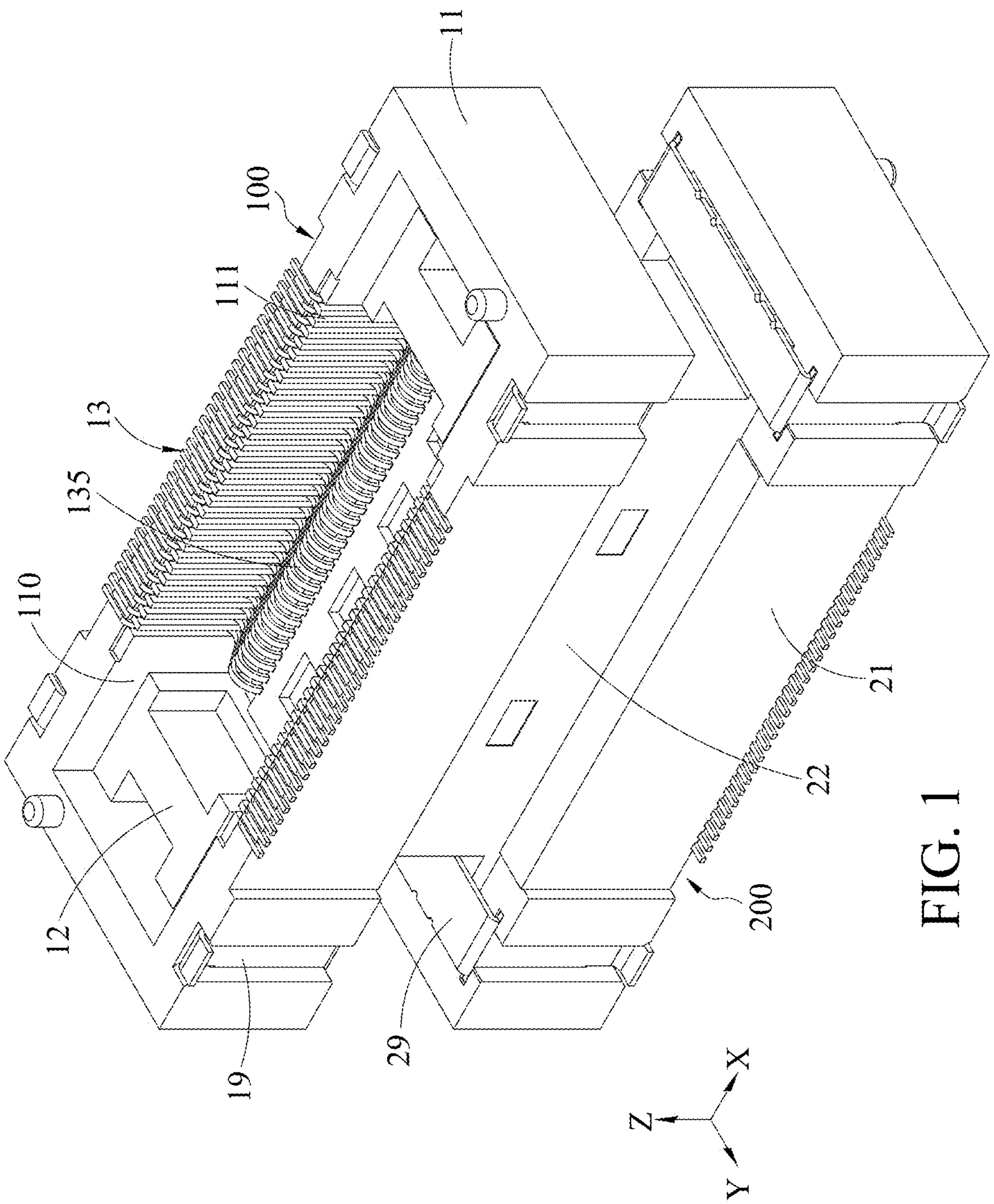
FIG. 1 illustrates a perspective view of an electrical connector assembly according to some embodiments of the instant disclosure.

Please refer to FIG. 1. FIG. 1 illustrates a perspective view of an electrical connector assembly according to some embodiments of the instant disclosure. The electrical connector assembly comprises an electrical plug connector 100 (plug) and an electrical receptacle connector 200 (receptacle), and the electrical connector assembly is a board-to-board (BTB) connector assembly.

Figure 2:
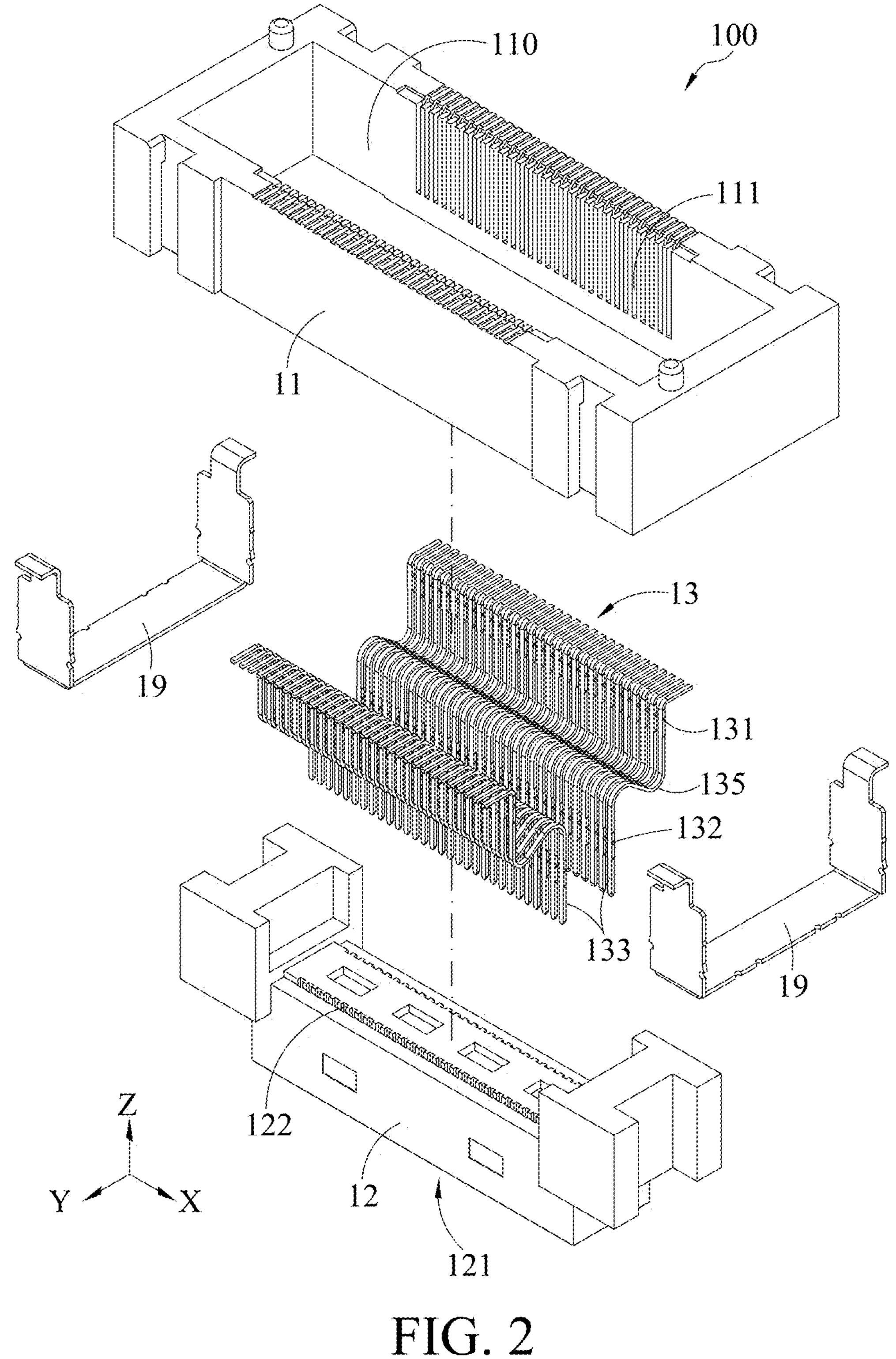
FIG. 2 illustrates an exploded view of an electrical plug connector according to some embodiments of the instant disclosure.
Figure 4:
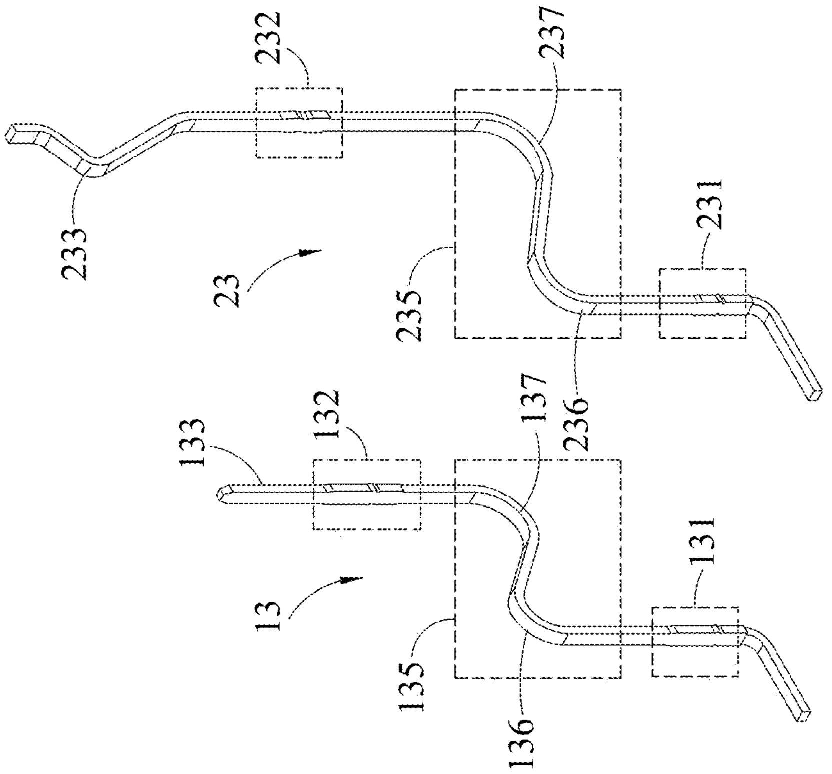
FIG. 4 illustrates a perspective view of plug terminals and receptacle terminals according to some embodiments of the instant disclosure.

Please refer to FIG. 2. FIG. 2 illustrates an exploded view of an electrical plug connector 100 according to some embodiments of the instant disclosure. In this embodiment, the electrical plug connector 100 comprises a plug fixation housing 11, a plug movable housing 12, and a plurality of plug terminals 13. The plug fixation housing 11 has a receiving space 110 and a plurality of first terminal positioning grooves 111 at two sides of the receiving space 110. The plug movable housing 12 is in the receiving space 110. The plug movable housing 12 has a plug mating portion 121 and a plurality of second terminal positioning grooves 122 at two sides of the plug mating portion 121, and the plug mating portion 121 is exposed from the receiving space 110. Each of the plug terminals 13 comprises a first fixation portion 131, a second fixation portion 132, and a plug contact portion 133 (as shown in FIG. 4). Each of the first fixation portions 131 is positioned at a corresponding one of the first terminal positioning grooves 111, and each of the second fixation portions 132 is positioned at a corresponding one of the second terminal positioning grooves 122. In each of the plug terminals 12, the plug contact portion 133 is adjacent to the second fixation portion 132.

Figure 3:
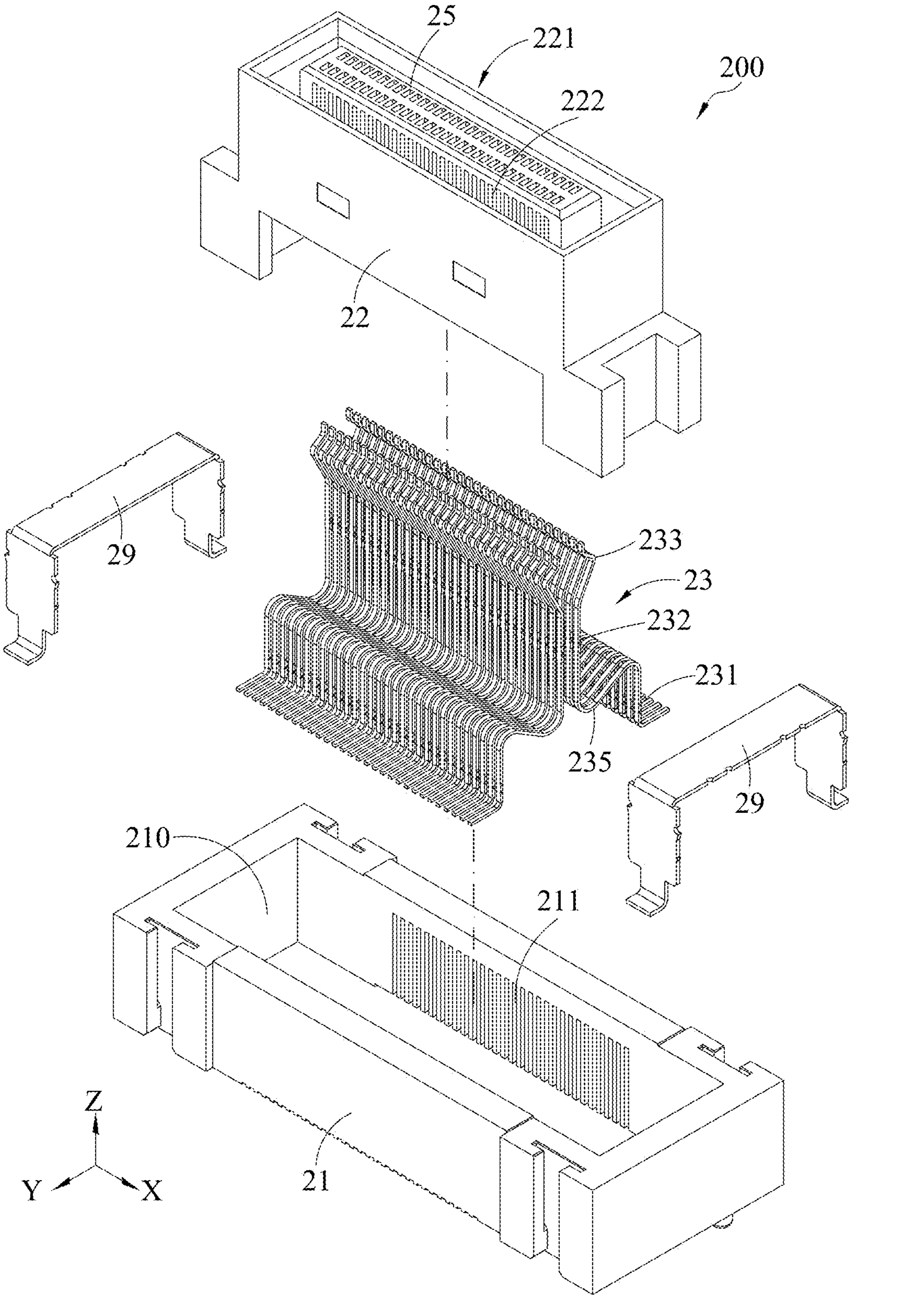
FIG. 3 illustrates an exploded view of an electrical receptacle connector according to some embodiments of the instant disclosure.

Please refer to FIG. 3. FIG. 3 illustrates an exploded view of an electrical receptacle connector 200 according to some embodiments of the instant disclosure. In this embodiment, the electrical receptacle connector 200 comprises a receptacle fixation housing 21, a receptacle movable housing 22, and a plurality of receptacle terminals 23. The receptacle fixation 21 housing has a working space 210 and a plurality of third terminal positioning grooves 211 at two sides of the working space 210. The receptacle movable housing 22 is in the working space 210. The receptacle movable housing 22 has a receptacle mating portion 221 and a plurality of fourth terminal positioning grooves 222 at two sides of the receptacle mating portion 221, and the receptacle mating portion 221 is exposed from the working space 210. Each of the receptacle terminals 23 comprises a third fixation portion 231, a fourth fixation portion 232, and a receptacle contact portion 233 (as shown in FIG. 4). Each of the third fixation portions 231 is positioned at a corresponding one of the third terminal positioning grooves 211, and each of the fourth fixation portions 232 is positioned at a corresponding one of the fourth terminal positioning grooves 222. In each of the receptacle terminals 23, the receptacle contact portion 233 is adjacent to the fourth fixation portion 232.

Figure 5:
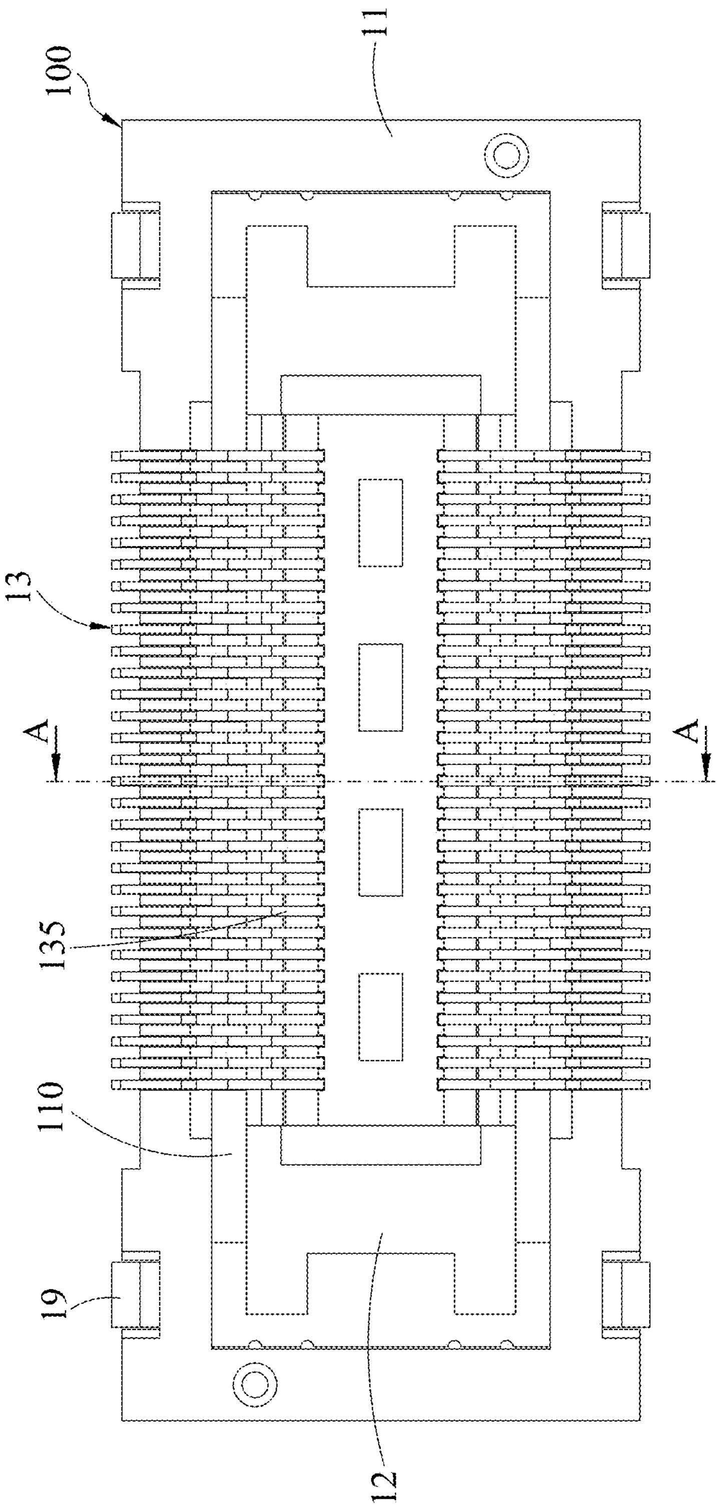
FIG. 5 illustrates a top schematic view of the electrical connector assembly according to some embodiments of the instant disclosure.
Figure 6:
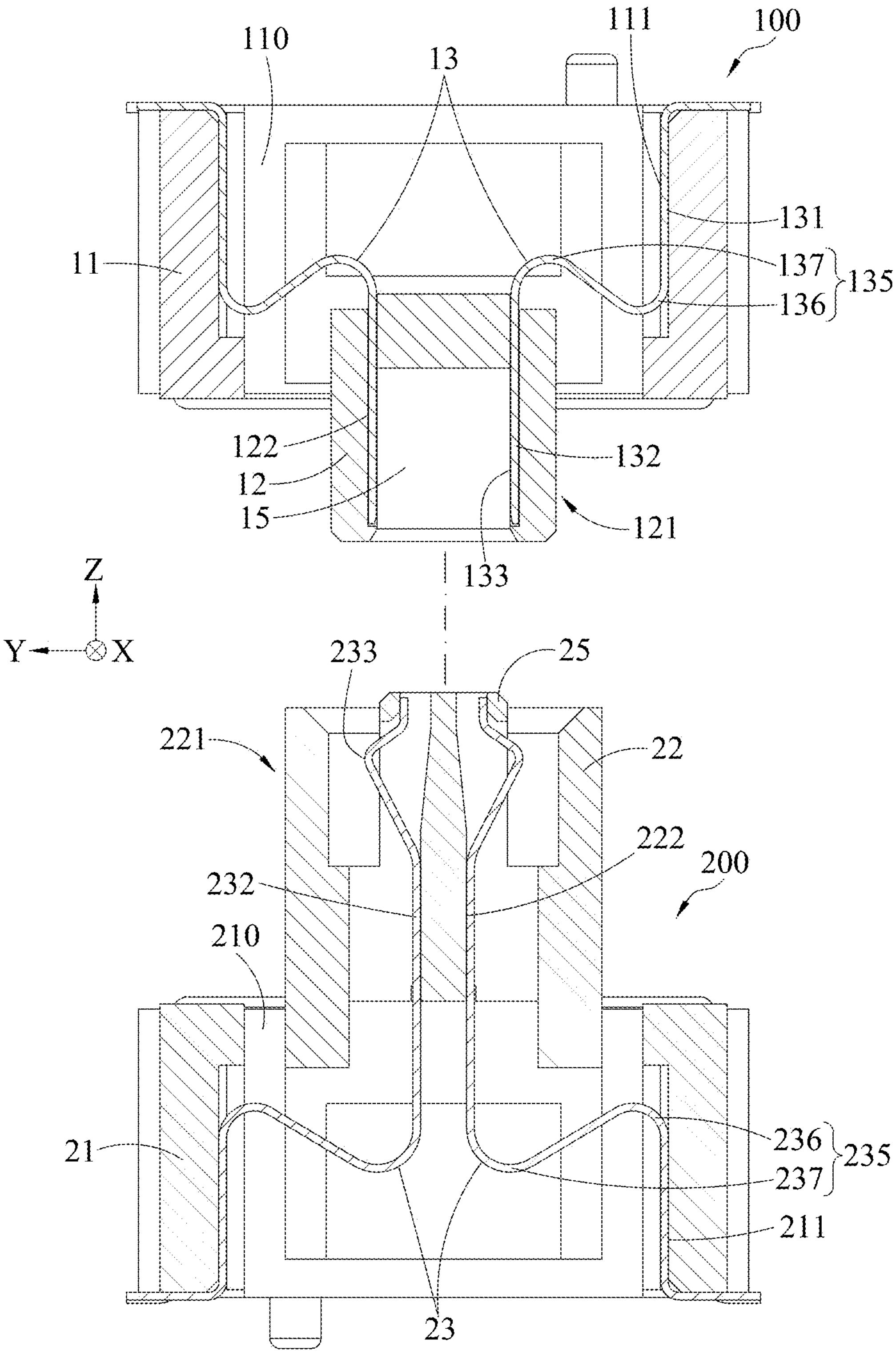
FIG. 6 illustrates a cross-sectional view of the portion A-A shown in FIG. 5, where electrical plug connector is not mated with the electrical receptacle connector.

Please refer to FIG. 3. The plug fixation housing 11 and the plug movable housing 12 are not in contact with each other, and the receptacle fixation housing 21 and the receptacle movable housing 22 are not in contact with each other. In the assembly of the electrical plug connector 100, the plug fixation housing 11 and the plug movable housing 12 are connected with each other through the plug terminals 13, and the plug movable housing 12 is at a middle portion of the plug fixation housing 11 in a floating manner (as shown in FIG. 5 and FIG. 6). Likewise, in the assembly of the electrical receptacle connector 200, the receptacle fixation housing 21 and the receptacle movable housing 22 are connected with each other through the receptacle terminals 23, and the receptacle movable housing 22 is at a middle portion of the receptacle fixation housing 21 in a floating manner (as shown in FIG. 5 and FIG. 6).

Figure 7:
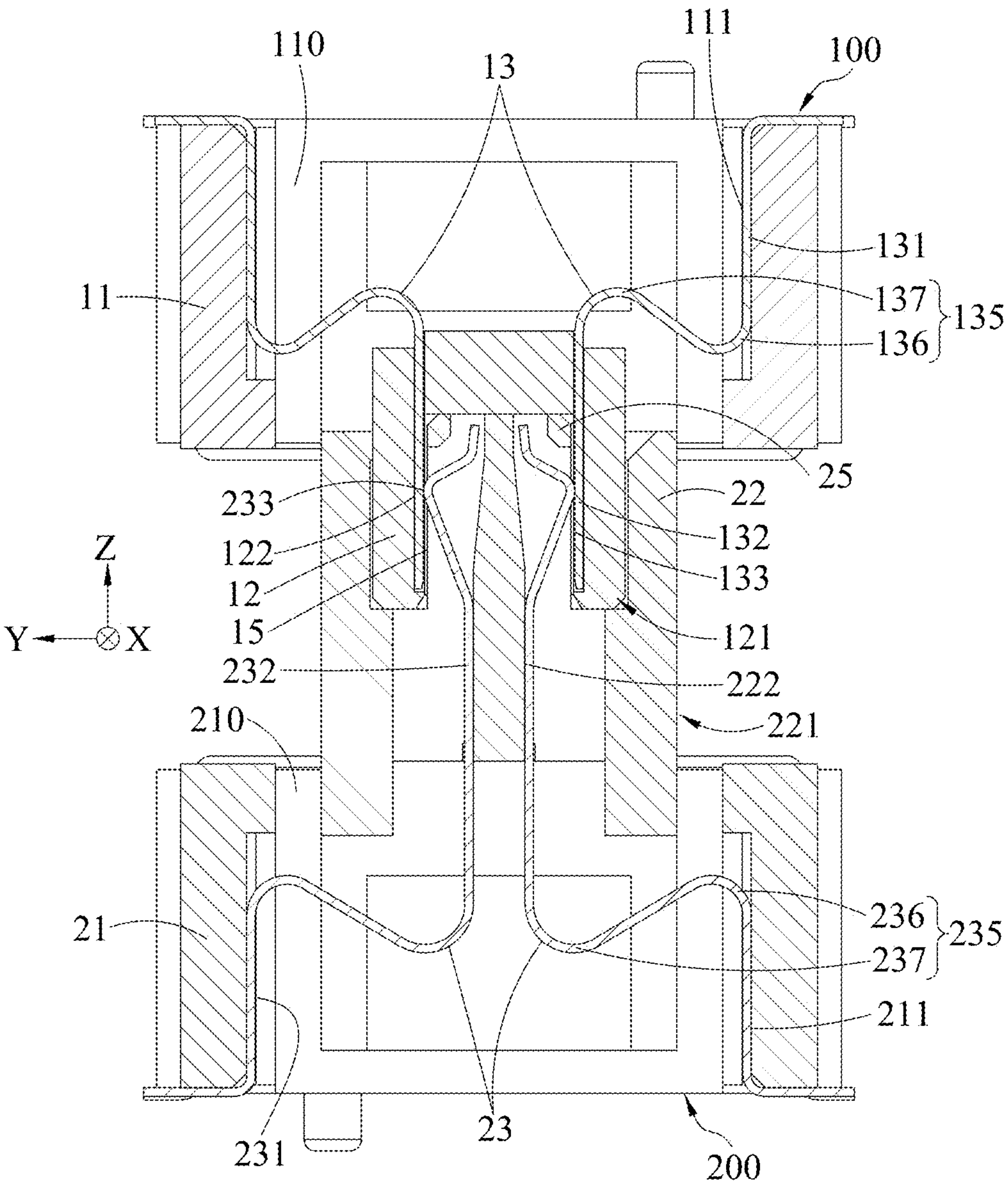
FIG. 7 illustrates a cross-sectional view of the portion A-A shown in FIG. 5, where electrical plug connector is mated with the electrical receptacle connector.

During the process of the mating between the electrical plug connector 100 and the electrical receptacle connector 200 (as shown in FIG. 6 and FIG. 7), both the plug movable housing 12 and the receptacle movable housing 22 can have certain offsets along the X-axis direction, the Y-axis direction, and the Z-axis direction. Therefore, even if the plug movable housing 12 does not properly align with the receptacle movable housing 22, the plug movable housing 12, or the receptacle movable housing 22, or both the plug movable housing 12 and the receptacle movable housing 22 can be adjusted with the offsets, so that the plug movable housing 12 can be mated with the receptacle movable housing 22 with a correct mating orientation. Hence, the coordination between the electrical plug connector 100 and the electrical receptacle connector 200 can be increased, and the mating flexibility of the electrical connector assembly can be achieved.

The plug movable housing 12 is floatingly connected to the plug fixation housing 11 through the plug terminals 13 (as shown in FIG. 5 and FIG. 6), and the plug terminals 13 have a higher elasticity. Likewise, the receptacle movable housing 22 is floatingly connected to the receptacle fixation housing 21 through the receptacle terminals 23, and the receptacle terminals 23 have a higher elasticity. Hence, during the process of the mating between the electrical plug connector 100 and the electrical receptacle connector 200, a portion of the stress (which occurs upon mating) can be absorbed by the plug terminals 13 and the receptacle terminals 23, so that the stress at the soldering portions (the portions of the terminals soldering to the circuit boards) can be reduced, thus reducing the occurrence of the cracks between the soldering portions and the soldering spots on the circuit board.

As shown in FIG. 2, in some embodiments, the plug fixation housing 11 is an elongated plastic member. The plug fixation housing 11 comprises a pair of first side walls and a pair of first end walls. The first side walls are opposite to and parallel with each other. The first end walls are opposite to and parallel with each other. The pair of the first side walls and the pair of the first end walls are enclosed to form the receiving space 110.

As shown in FIG. 3, in some embodiments, the receptacle fixation housing 21 is an elongated plastic member. The receptacle fixation housing 21 comprises a pair of second side walls and a pair of second end walls. The second side walls are opposite to and parallel with each other. The second end walls are opposite to and parallel with each other. The pair of the second side walls and the pair of the second end walls are enclosed to form the working space 210.

Please refer to FIG. 6. In some embodiments, the plug terminals 13 are disposed on the plug fixation housing 11 and are arranged into two rows opposite to each other. Each of the plug terminals 13 comprises a plug contact portion 133 (which is a plate-shaped structure; flat contact portion) and a plug tail portion. The plug contact portion 133 and the plug tail portion are integrally formed with each other. The plug contact portion 133 is arranged on the plug movable housing 12, the plug tail portion extends out of the plug fixation housing 11 and soldered with a circuit board. The plug terminals 13 are provided for signal transmission or current transmission, where the current is between 0.3 A and 0.5 A.

Please refer to FIG. 6. In some embodiments, the receptacle terminals 23 are disposed on the receptacle fixation housing 21 and are arranged into two rows opposite to each other. Each of the receptacle terminals 23 comprises a receptacle contact portion 233 (which is a protruding structure; elastic contact portion) and a receptacle tail portion. The receptacle contact portion 233 and the receptacle tail portion are integrally formed with each other. The receptacle contact portion 233 is arranged on the receptacle movable housing 22, the receptacle tail portion extends out of the receptacle fixation housing 21 and soldered with a circuit board. The receptacle terminals 23 are provided for signal transmission or current transmission, where the current is between 0.3 A and 0.5 A.

Please refer to FIG. 4. In some embodiments, each of the plug terminals 13 has a plug continuous bending portion 135 between the first fixation portion 131 and the second fixation portion 132, and the first fixation portion 131 and the second fixation portion 132 are at different horizontal axes. In each of the plug terminals 13, the plug continuous bending portion 135 is S-shaped and has a first turning portion 136 and a second turning portion 137, the first turning portion 136 is adjacent to the first fixation portion 131, and the second turning portion 137 is adjacent to the second fixation portion 132. For the plug contact portion 133, a fixation region of the second fixation portion 132 is fixed with the plug movable housing 12, and a fixation region of the first fixation portion 131 is fixed with the plug fixation housing 11, so that the plug continuous bending portion 135 is floatingly arranged between the plug fixation housing 11 and the plug movable housing 12. Moreover, please refer to FIGS. 6 and 7, a height difference between the second turning portion 137 and the top portion 1311 of the first fixation portion 131.

Please refer to FIG. 4. In some embodiments, each of the receptacle terminals 23 has a receptacle continuous bending portion 235 between the third fixation portion 231 and the fourth fixation portion 232, and the third fixation portion 231 and the fourth fixation portion 232 are at different horizontal axes. In each of the receptacle terminals 23, the receptacle continuous bending portion 235 is S-shaped and has a third turning portion 236 and a fourth turning portion 237, the third turning portion 236 is adjacent to the third fixation portion 231, and the fourth turning portion 237 is adjacent to the fourth fixation portion 232. For the receptacle contact portion 233, a fixation region of the fourth fixation portion 232 is fixed with the receptacle movable housing 22, and a fixation region of the third fixation portion 231 is fixed with the receptacle fixation housing 21, so that the receptacle continuous bending portion 235 is floatingly arranged between the receptacle fixation housing 21 and the receptacle movable housing 22. Moreover, please refer to FIGS. 6 and 7, a height difference between the fourth turning portion 237 and the bottom portion 2311 of the third fixation portion 231.

Please refer to FIG. 6. In some embodiments, the plug mating portion 121 of the plug movable housing 12 has an insertion groove 15, the receptacle mating portion 221 of the receptacle movable housing 22 has a protrusion 25, and the protrusion 25 is mated with the insertion groove 15.

Please refer to FIG. 6. In some embodiments, the plug contact portions 133 of the plug terminals 13 are at two sides of the insertion groove 15, and the receptacle contact portions 233 of the receptacle terminals 23 protrude from two sides of the protrusion 25.

Please refer to FIG. 1. In some embodiments, the electrical connector assembly further comprises a plurality of plug hold-down members 19. Each of the plug hold-down members 19 is of an inverse U-shaped plate structure. The plug hold-down members 19 are fixed on the plug fixation housing 11 and limited at two sides of the plug movable housing 12. Therefore, the plug movable housing 12 can be prevented from being detached from the plug fixation housing 11. The plug hold-down members 19 (such as metallic shells) on the plug fixation housing 11 limit the lateral movement of the plug movable housing 12 along the Z-axis direction. When the electrical plug connector 100 is detached from the electrical receptacle connector 200, the plug hold-down members 19 can effectively prevent the plug movable housing 12 from being closely held with the electrical receptacle connector 200 and thus detached from the plug fixation housing 11, which will cause the damage or malfunction of the product.

Please refer to FIG. 1. In some embodiments, the electrical connector assembly further comprises a plurality of receptacle hold-down members 29. Each of the receptacle hold-down members 29 is of an inverse U-shaped plate structure. The receptacle hold-down members 29 are fixed on the receptacle fixation housing 21 and limited at two sides of the receptacle movable housing 22. Therefore, the receptacle movable housing 22 can be prevented from being detached from the receptacle fixation housing 21. The receptacle hold-down members 29 (such as metallic shells) on the receptacle fixation housing 21 limit the lateral movement of the receptacle movable housing 22 along the Z-axis direction. When the electrical plug connector 100 is detached from the electrical receptacle connector 200, the receptacle hold-down members 29 can effectively prevent the receptacle movable housing 22 from being closely held with the electrical plug connector 100 and thus detached from the receptacle fixation housing 21, which will cause the damage or malfunction of the product.

Based on the above, according to one or some embodiments of the instant disclosure, the plug movable housing of the electrical plug connector and the receptacle movable housing of the electrical receptacle connector are mated with each other in a floating manner, thus allowing the electrical plug connector and the electrical receptacle connector to be mated with each other stably, and increasing the layout flexibility of the circuit boards soldered with the connector assembly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical connector assembly, comprising:

an electrical plug connector comprising:

a plug fixation housing having a receiving space and a plurality of first terminal positioning grooves at two sides of the receiving space;

a plug movable housing in the receiving space, wherein the plug movable housing has a plug mating portion and a plurality of second terminal positioning grooves at two sides of the plug mating portion, and the plug mating portion is exposed from the receiving space; and a plurality of plug terminals, wherein each of the plug terminals comprises a first fixation portion, a second fixation portion, a plug contact portion, and a plug continuous bending portion; each of the first fixation portions is positioned at a corresponding one of the first terminal positioning grooves, and each of the second fixation portions is positioned at a corresponding one of the second terminal positioning grooves; in each of the plug terminals, the plug contact portion is adjacent to the second fixation portion, and the plug continuous bending portion is between the first fixation portion and the second fixation portion, and the first fixation portion and the second fixation portion are at different horizontal axes, and the plug continuous bending portion is floatingly arranged between the plug fixation housing and the plug movable housing; and an electrical receptacle connector comprising:

a receptacle fixation housing having a working space and a plurality of third terminal positioning grooves at two sides of the working space;

a receptacle movable housing in the working space, wherein the receptacle movable housing has a receptacle mating portion and a plurality of fourth terminal positioning grooves at two sides of the receptacle mating portion, and the receptacle mating portion is exposed from the working space; and a plurality of receptacle terminals, wherein each of the receptacle terminals comprises a third fixation portion, a fourth fixation portion, a receptacle contact portion and a receptacle continuous bending portion; each of the third fixation portions is positioned at a corresponding one of the third terminal positioning grooves, and each of the fourth fixation portions is positioned at a corresponding one of the fourth terminal positioning grooves; in each of the receptacle terminals, the receptacle contact portion is adjacent to the fourth fixation portion, the receptacle continuous bending portion is between the third fixation portion and the fourth fixation portion, and the third fixation portion and the fourth fixation portion are at different horizontal axes, and the receptacle continuous bending portion is floatingly arranged between the receptacle fixation housing and the receptacle movable housing;

wherein the plug movable housing is floatingly arranged on the plug fixation housing.

2. The electrical connector assembly according to claim 1, wherein in each of the plug terminals, the plug continuous bending portion is S-shaped and has a first turning portion and a second turning portion, the first turning portion is adjacent to the first fixation portion, and the second turning portion is adjacent to the second fixation portion, and wherein a height difference between the second turning portion and the top portion of the first fixation portion.

3. The electrical connector assembly according to claim 1, wherein in each of the receptacle terminals, the receptacle continuous bending portion is S-shaped and has a third turning portion and a fourth turning portion, the third turning portion is adjacent to the third fixation portion, and the fourth turning portion is adjacent to the fourth fixation portion, and wherein a height difference is between the fourth turning portion and the bottom portion of the third fixation portion.

4. The electrical connector assembly according to claim 1, wherein the plug mating portion of the plug movable housing has an insertion groove, the receptacle mating portion of the receptacle movable housing has a protrusion, and the protrusion is mated with the insertion groove.

5. The electrical connector assembly according to claim 4, wherein the plug contact portions of the plug terminals are at two sides of the insertion groove, and the receptacle contact portions of the receptacle terminals protrude from two sides of the protrusion.

6. The electrical connector assembly according to claim 1, further comprising a plurality of plug hold-down members, wherein the plug hold-down members are fixed on the plug fixation housing and limited at two sides of the plug movable housing.

7. The electrical connector assembly according to claim 1, further comprising a plurality of receptacle hold-down members, wherein the receptacle hold-down members are fixed on the receptacle fixation housing and limited at two sides of the receptacle movable housing.

8. An electrical plug connector, comprising:

a plug fixation housing having a receiving space and a plurality of first terminal positioning grooves at two sides of the receiving space;

a plug movable housing in the receiving space, wherein the plug movable housing has a plug mating portion and a plurality of second terminal positioning grooves at two sides of the plug mating portion, and the plug mating portion is exposed from the receiving space; and a plurality of plug terminals, wherein each of the plug terminals comprises a first fixation portion, a second fixation portion, and a plug contact portion, and a plug continuous bending portion; wherein each of the first fixation portions is positioned at a corresponding one of the first terminal positioning grooves, and each of the second fixation portions is positioned at a corresponding one of the second terminal positioning grooves; in each of the plug terminals, the plug contact portion is adjacent to the second fixation portion, and the plug continuous bending portion is between the first fixation portion and the second fixation portion, and the first fixation portion and the second fixation portion are at different horizontal axes, and the plug continuous bending portion is floatingly arranged between the plug fixation housing and the plug movable housing.

9. The electrical plug connector according to claim 8, wherein in each of the plug terminals, the plug continuous bending portion is S-shaped and has a first turning portion and a second turning portion, the first turning portion is adjacent to the first fixation portion, and the second turning portion is adjacent to the second fixation portion, and wherein a height difference between the second turning portion and the top portion of the first fixation portion.

10. The electrical plug connector according to claim 8, wherein the plug mating portion of the plug movable housing has an insertion groove, and the plug contact portions of the plug terminals are at two sides of the insertion groove.

11. The electrical plug connector according to claim 8, further comprising a plurality of plug hold-down members, wherein the plug hold-down members are fixed on the plug fixation housing and limited at two sides of the plug movable housing.

12. An electrical receptacle connector, comprising:

a receptacle fixation housing having a working space and a plurality of third terminal positioning grooves at two sides of the working space;

a receptacle movable housing in the working space, wherein the receptacle movable housing has a receptacle mating portion and a plurality of fourth terminal positioning grooves at two sides of the receptacle mating portion, and the receptacle mating portion is exposed from the working space; and a plurality of receptacle terminals, wherein each of the receptacle terminals comprises a third fixation portion, a fourth fixation portion, a receptacle contact portion and receptacle continuous bending portion; each of the third fixation portions is positioned at a corresponding one of the third terminal positioning grooves, and each of the fourth fixation portions is positioned at a corresponding one of the fourth terminal positioning grooves; in each of the receptacle terminals, the receptacle contact portion is adjacent to the fourth fixation portion, the receptacle continuous bending portion is between the third fixation portion and the fourth fixation portion, and the third fixation portion and the fourth fixation portion are at different horizontal axes, and the receptacle continuous bending portion is floatingly arranged between the receptacle fixation housing and the receptacle movable housing.

13. The electrical receptacle connector according to claim 12, wherein in each of the receptacle terminals, the receptacle continuous bending portion is S-shaped and has a third turning portion and a fourth turning portion, the third turning portion is adjacent to the third fixation portion, and the fourth turning portion is adjacent to the fourth fixation portion and wherein a height difference is between the fourth turning portion and the bottom portion of the third fixation portion.

14. The electrical receptacle connector according to claim 12, wherein the receptacle mating portion of the receptacle movable housing has a protrusion, and the receptacle contact portions of the receptacle terminals protrude from two sides of the protrusion.

15. The electrical receptacle connector according to claim 12, further comprising a plurality of receptacle hold-down members, wherein the receptacle hold-down members are fixed on the receptacle fixation housing and limited at two sides of the receptacle movable housing.

* * * * *